United States Patent
Abolt

(10) Patent No.: US 10,883,437 B2
(45) Date of Patent: Jan. 5, 2021

(54) HORSEPOWER ON DEMAND SYSTEM

(71) Applicant: Doug Abolt, Donnellson, IA (US)

(72) Inventor: Doug Abolt, Donnellson, IA (US)

(*) Notice: Subject to any disclaimer, the term of this patent is extended or adjusted under 35 U.S.C. 154(b) by 191 days.

(21) Appl. No.: 16/135,063

(22) Filed: Sep. 19, 2018

(65) Prior Publication Data

US 2019/0085785 A1 Mar. 21, 2019

Related U.S. Application Data

(60) Provisional application No. 62/560,499, filed on Sep. 19, 2017.

(51) Int. Cl.
| | |
|---|---|
| *F02D 41/26* | (2006.01) |
| *G06Q 20/02* | (2012.01) |
| *F02D 41/24* | (2006.01) |
| *G07F 15/00* | (2006.01) |
| *G06Q 20/14* | (2012.01) |
| *G06Q 20/32* | (2012.01) |
| *G07F 17/00* | (2006.01) |
| *G01S 19/42* | (2010.01) |
| *A01B 79/00* | (2006.01) |

(52) U.S. Cl.
CPC ......... *F02D 41/26* (2013.01); *F02D 41/2487* (2013.01); *G06Q 20/02* (2013.01); *G06Q 20/145* (2013.01); *G06Q 20/322* (2013.01); *G07F 15/003* (2013.01); *G07F 15/005* (2013.01); *G07F 17/0057* (2013.01); *A01B 79/005* (2013.01); *F02D 41/266* (2013.01); *F02D 2200/604* (2013.01); *F02D 2200/701* (2013.01); *F02D 2400/11* (2013.01); *G01S 19/42* (2013.01)

(58) Field of Classification Search
CPC ............ A01B 79/005; F02D 2200/604; F02D 2200/701; F02D 2400/11; F02D 41/2487; F02D 41/26; F02D 41/266; G01S 19/42; G06Q 20/02; G06Q 20/145; G06Q 20/322; G07F 15/003; G07F 15/005; G07F 17/0057
See application file for complete search history.

(56) References Cited

U.S. PATENT DOCUMENTS 6,070,673 A * 6/2000 Wendte ................ A01B 79/005
172/2
6,079,340 A * 6/2000 Flamme .............. A01M 7/0089
111/178

(Continued)

FOREIGN PATENT DOCUMENTS

WO WO-2010101909 A2 * 9/2010 ............. G07C 5/008

*Primary Examiner* — Babar Sarwar
(74) *Attorney, Agent, or Firm* — Christopher A. Proskey; BrownWinick Law Firm

(57) ABSTRACT

A horsepower on demand system is presented that facilitates a user to purchase additional power from a third party provider. The system includes a vehicle with an engine, a control system, a microprocessor, memory and software and a wireless communications module. The system also includes a third party provider having a module, a database, software, and an interface. When a user purchases additional power from the third party provider, the third party provider transmits a control signal over a wireless communications network to the vehicle and the vehicle's control system modifies the operational characteristics of the motor thereby increasing the power output.

22 Claims, 2 Drawing Sheets

(56) References Cited

U.S. PATENT DOCUMENTS

| | | | | |
|---|---|---|---|---|
| 7,917,251 | B2* | 3/2011 | Kressner | G01R 22/063 700/286 |
| 10,562,406 | B2* | 2/2020 | Williams | B60L 53/60 |
| 2002/0079148 | A1* | 6/2002 | Aoki | B60K 6/445 180/65.235 |
| 2005/0197766 | A1* | 9/2005 | Flann | G05D 1/0219 701/533 |
| 2008/0228345 | A1* | 9/2008 | Heinle | F02D 41/2493 701/31.4 |
| 2009/0082957 | A1* | 3/2009 | Agassi | B60L 53/11 701/532 |
| 2009/0184689 | A1* | 7/2009 | Kressner | G01R 22/063 320/162 |
| 2010/0102776 | A1* | 4/2010 | Uchida | B60L 50/16 320/109 |
| 2010/0161165 | A1* | 6/2010 | Basir | G06Q 30/0207 701/22 |
| 2010/0312428 | A1* | 12/2010 | Roberge | G01S 19/53 701/23 |
| 2011/0025267 | A1* | 2/2011 | Kamen | B60L 8/003 320/109 |
| 2011/0153131 | A1* | 6/2011 | Kressner | B60L 53/14 701/22 |
| 2012/0101634 | A1* | 4/2012 | Lindores | A01B 79/005 700/266 |
| 2014/0062401 | A1* | 3/2014 | Gadh | B60L 53/66 320/109 |
| 2014/0074523 | A1* | 3/2014 | Turner | G06Q 10/02 705/5 |
| 2014/0089016 | A1* | 3/2014 | Smullin | G06Q 10/02 705/5 |
| 2015/0081122 | A1* | 3/2015 | Yonetani | G06Q 10/0631 700/291 |
| 2015/0142250 | A1* | 5/2015 | Cavender-Bares | A01C 7/004 701/23 |
| 2015/0248801 | A1* | 9/2015 | Froitzheim | B60R 25/245 340/5.61 |
| 2015/0321570 | A1* | 11/2015 | Cun | B60L 53/14 705/34 |
| 2016/0023557 | A1* | 1/2016 | Dimke | B60L 53/66 320/108 |
| 2016/0040995 | A1* | 2/2016 | Kano | G07C 5/02 701/123 |
| 2016/0129802 | A1* | 5/2016 | Yoon | G06Q 20/145 705/412 |
| 2016/0157275 | A1* | 6/2016 | Matthews | H04W 72/005 701/2 |
| 2017/0043674 | A1* | 2/2017 | DeBoer, III | B60L 53/31 |
| 2017/0140603 | A1* | 5/2017 | Ricci | H02J 7/35 |
| 2017/0146354 | A1* | 5/2017 | Boss | G07C 5/008 |
| 2017/0282736 | A1* | 10/2017 | Goei | G01C 21/3469 |
| 2017/0339820 | A1* | 11/2017 | Foster | G01C 21/16 |
| 2018/0081360 | A1* | 3/2018 | Bostick | G06Q 10/04 |
| 2018/0189683 | A1* | 7/2018 | Newman | G01C 21/3605 |
| 2018/0325051 | A1* | 11/2018 | De Mello Brandao | A01G 7/00 |
| 2018/0347479 | A1* | 12/2018 | Nakamura | F02D 41/021 |
| 2019/0001981 | A1* | 1/2019 | Thunga Gopal | B60W 30/18018 |
| 2019/0016384 | A1* | 1/2019 | Carlson | B60L 53/35 |

* cited by examiner

HORSEPOWER ON DEMAND SYSTEM

CROSS REFERENCE TO RELATED APPLICATIONS

This utility patent application claims priority to U.S. Provisional Patent Application No. 62/560,499 filed on Sep. 19, 2017, the entirety of which is fully incorporated by reference herein.

FIELD OF THE DISCLOSURE

This disclosure relates generally to motor vehicles and, more particularly, to a system of providing on demand horsepower to motor vehicles.

BACKGROUND OF THE DISCLOSURE

Motor vehicles are old and well known in the art. There are countless forms of different kinds of vehicles. As examples, there are passenger vehicles, such as cars, trucks, SUVs and the like; there are commercial vehicles such as tractor trailers, busses and the like; there are agricultural vehicles such as tractors, combines, sprayers, spreaders and the like; there are construction vehicles such as bulldozers, backhoes, cranes, pavers, rollers/compactors, and the like; there are sport and off road vehicles such as motorcycles, four wheelers, three wheelers, utility vehicles and the like among countless others. These motor vehicles can be gasoline powered, diesel powered, electric powered, hybrid powered, or powered by any other form of energy.

One common feature among all of these vehicles is that they include an engine that produces horsepower (or simply power) that is controlled by a control system. As technology has improved, manufacturers have been able to generate ever-increasing amounts of power out of a given engine form factor through the use of differing control schemes employed by electronic control systems. These electronic control systems make it possible to provide an array of horsepower options with an identical or nearly identical engine. As such, manufacturers can provide vehicles that vary in power output but have identical or nearly identical physical configurations. This may be accomplished by simply modifying the manners in which the engine is controlled by the control system, such as by using different software, firmware, instructions or control methodologies.

The ability to provide vehicles that are physically identical or practically physically identical but have different power outputs has provided manufacturers with the ability to further segment their consumer groups. That is, manufactures can provide lower powered vehicles at a discount to more cost sensitive consumers while providing higher powered vehicles at a premium price to consumers that want or need increased performance. However, this arrangement has its disadvantages.

Namely, while some consumers may elect to purchase a lower priced vehicle that has less power, these same consumers may likely be faced with situations where additional power is needed, such as when towing, plowing, hauling or the like. However, while their vehicle may be physically capable of increased performance, there is no current system that enables the user to harness the increased performance their vehicle is capable of when it is needed.

For the reasons stated above, and for other reasons stated below which will become apparent to those skilled in the art upon reading and understanding the present specification, claims and drawings there is a need in the art for a method and system of providing horsepower on demand.

Thus it is an object of at least one embodiment of the disclosure to provide a horsepower on demand system that improves upon the state of the art.

Another object of at least one embodiment of the disclosure to provide a horsepower on demand system that allows a user to modify the amount of horsepower their vehicle produces.

Yet another object of at least one embodiment of the disclosure to provide a horsepower on demand system that allows a user to purchase increased horsepower when needed.

Another object of at least one embodiment of the disclosure to provide a horsepower on demand system that reduces the cost of purchase price of a vehicle.

Yet another object of at least one embodiment of the disclosure to provide a horsepower on demand system that provides a purchaser of a vehicle with greater flexibility and options.

Another object of at least one embodiment of the disclosure to provide a horsepower on demand system that is environmentally friendly.

Yet another object of at least one embodiment of the disclosure to provide a horsepower on demand system that reduces emissions and energy consumption.

Another object of at least one embodiment of the disclosure to provide a horsepower on demand system that reduces the cost of vehicle ownership.

Yet another object of at least one embodiment of the disclosure to provide a horsepower on demand system that reduces the cost of vehicle operation.

Another object of at least one embodiment of the disclosure to provide a horsepower on demand system that is easy to use.

Yet another object of at least one embodiment of the disclosure to provide a horsepower on demand system that is efficient.

Another object of at least one embodiment of the disclosure to provide a horsepower on demand system that can be used with any vehicle.

Yet another object of at least one embodiment of the disclosure to provide a horsepower on demand system that can be used with any motor or engine.

Another object of at least one embodiment of the disclosure to provide a horsepower on demand system that is cost effective.

Yet another object of at least one embodiment of the disclosure to provide a horsepower on demand system that is safe to use.

Another object of at least one embodiment of the disclosure to provide a horsepower on demand system that has a long useful life.

Yet another object of at least one embodiment of the disclosure to provide a horsepower on demand system that provides functionality that did not previously exist.

Another object of at least one embodiment of the disclosure to provide a horsepower on demand system that allows a user to modify the power output of their vehicle quickly.

Yet another object of at least one embodiment of the disclosure to provide a horsepower on demand system that has a wide variety of uses.

Another object of at least one embodiment of the disclosure to provide a horsepower on demand system that has a wide variety of applications.

Yet another object of at least one embodiment of the disclosure to provide a horsepower on demand system that provides value.

Another object of at least one embodiment of the disclosure to provide a horsepower on demand system that is relatively inexpensive.

Yet another object of at least one embodiment of the disclosure to provide a horsepower on demand system that allows vehicle manufacturers to generate additional revenue.

These and other objects, features, or advantages of at least one embodiment will become apparent from the specification, figures and claims.

BRIEF SUMMARY OF THE INVENTION

A horsepower on demand system is presented that facilitates a user to purchase additional power from a third party provider. The system includes a vehicle with an engine, a control system, a microprocessor, memory and software and a wireless communications module. The system also includes a third party provider having a module, a database, software, and an interface. When a user purchases additional power from the third party provider, the third party provider transmits a control signal over a wireless communications network to the vehicle and the vehicle's control system modifies the operational characteristics of the motor thereby increasing the power output.

DETAILED DESCRIPTION

Figure 1:
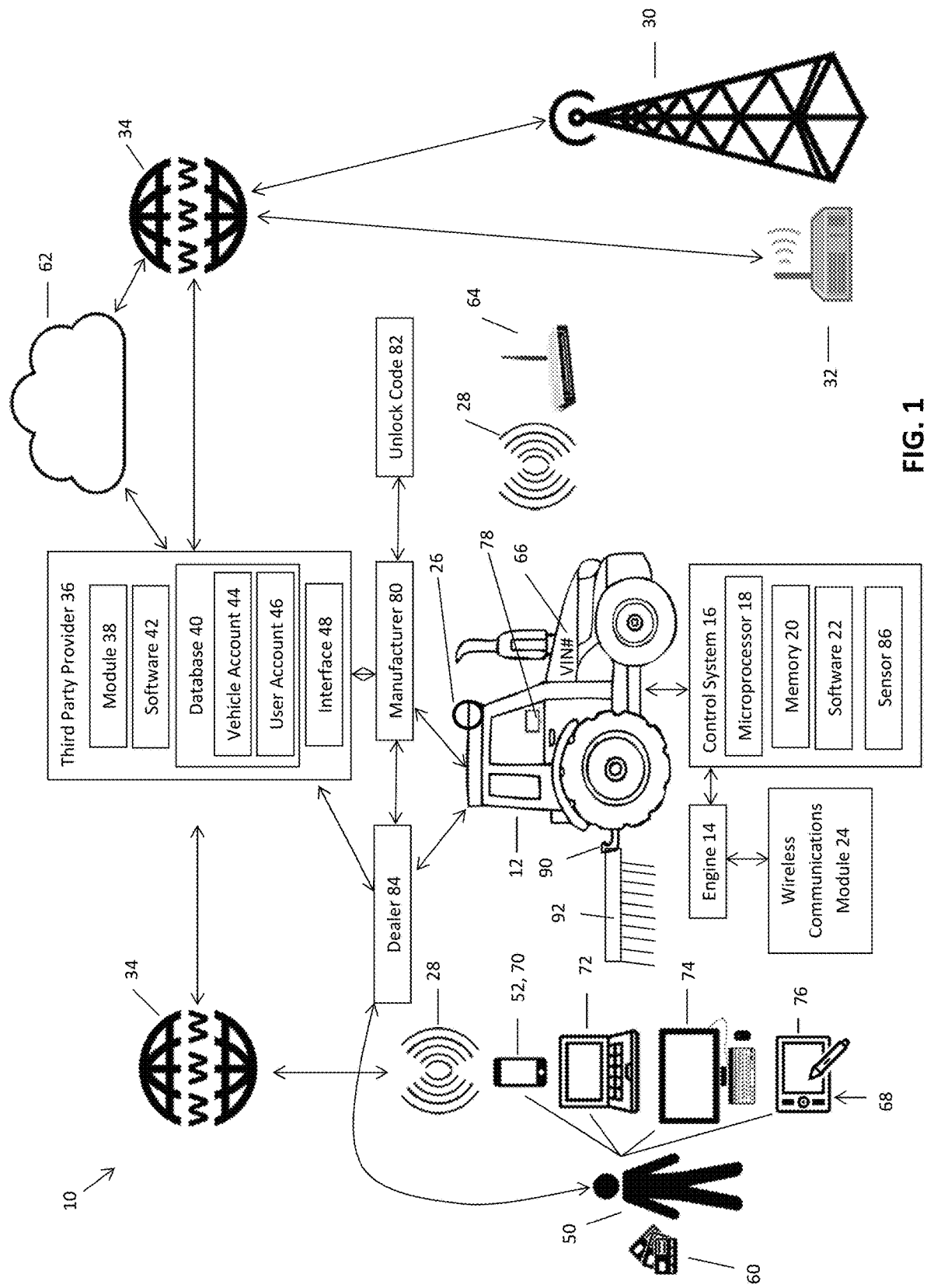
FIG. 1 is a plan view of a horsepower on demand system having a vehicle with an engine, a control system, a microprocessor, memory and software and a wireless communications module, the system also includes a third party provider having a module, a database, software, and an interface, the system includes a user that connects with the third party provider through a phone or internet communications.

In the following detailed description of the embodiments, reference is made to the accompanying drawings which form a part hereof, and in which is shown by way of illustration specific preferred embodiments in which the invention may be practiced. These embodiments are described in sufficient detail to enable those skilled in the art to practice the invention, and it is to be understood that other embodiments may be utilized and that mechanical, procedural, and other changes may be made without departing from the spirit and scope of the present inventions. The following detailed description is, therefore, not to be taken in a limiting sense, and the scope of the present invention is defined only by the appended claims, along with the full scope of equivalents to which such claims are entitled.

As used herein, the terminology such as vertical, horizontal, top, bottom, front, back, end and sides are referenced according to the views presented. It should be understood, however, that the terms are used only for purposes of description, and are not intended to be used as limitations. Accordingly, orientation of an object or a combination of objects may change without departing from the scope of the invention.

Reference is made to a vehicle herein. The term vehicle is intended to be construed broadly and is intended to include any moving vehicle having an engine or motor. However, it is intended to be understood that the teachings of this disclosure are applicable to any engine or motor, regardless whether the engine or motor is part of a vehicle. Said another way, the horsepower on demand system and method taught and disclosed herein is intended to be equally applicable to vehicles as well as engines or motors that are not part of a vehicle, such as generators, pumps, and the like without parting from the spirit and scope of the disclosure and teaching.

System:

In one arrangement, as is shown, the horsepower on demand system 10 (or simply "system 10") includes the following components, among others, a motor vehicle 12 having an engine 14, a control system 16 including a microprocessor 18 and memory 20 and software 22, a wireless communications module 24 and an antenna 26. The system 10 also includes a wireless network 28 that connects through a cellular communications tower 30 or router 32 to the internet 34. The system 10 also includes a third party provider 36 having a module 38, a database 40, software 42, a vehicle account 44, a user account 46 and an interface 48. The system also includes a user 50 having a communication device 52 such as a phone 70, a laptop computer 72, a desktop computer 74 and/or a tablet computer 76 and a payment method 60. The system 10 is configured to facilitate user 50 to increase the horsepower output of vehicle 12 on demand by contacting third party provider 36 and providing a payment method 60. Payment method 60 may be any form or manner of making a financial payment such as a credit card, debit card, wire, electronic funds transfer, a check or e-check, a PayPal account, another financial or banking account, or any other form or method of making payment. Upon receiving contact and payment 60 from user 50, the third party provider connects through the internet 34 and/or cloud 62 to vehicle 12 and provides instructions to control system 16 to increase power output.

Vehicle:

In the arrangement shown, system 10 includes a motor vehicle 12, or simply vehicle 12. Vehicle 12 is formed of any suitable size, shape and design and can take on any form of a configuration such as a passenger vehicle, such as a car, truck, van, SUV or the like; a commercial vehicle such as a tractor trailer, bus or the like; an agricultural vehicle such as a tractor, combine, sprayer, spreader or the like; a construction vehicle such as bulldozer, backhoe, crane, paver, roller/compactor, or the like; a sport or off road vehicle such as a motorcycle, four wheeler, three wheeler, utility vehicle or the like among countless other configurations. In one arrangement, as is shown, as one example, vehicle 12 is depicted as an agricultural tractor.

In the arrangement shown, as one example, vehicle 12 includes an engine 14. Engine 14 is formed of any suitable size, shape and design and is configured to supply power to vehicle 14. This power may be used for any purpose such as for driving vehicle 12 or alternatively for powering components such as a power-take-off shaft ("PTO"), an implement, a boom, a pump, a winch, or any other components or any combination thereof. Engine 14 may be a gas powered internal combustion engine, a diesel powered internal combustion engine, an electric motor, a hybrid arrangement or any other form of an engine or motor or the like.

In the arrangement shown, a control system 16 is connected to vehicle 12 and engine 14. Control system 16 is formed of any suitable size, shape and design and is configured to control and/or facilitate control of engine 14 and motor vehicle 12. In one arrangement, as is shown, as one example, control system 16 includes a microprocessor 18, memory 20 and software 22, among other components.

Microprocessor 18 is any form of a device that is configured to receive instructions or signals and process them according to instructions or software 22 stored in memory 20 into output commands or control signals in response thereto. Microprocessor 18 may be formed of a single electronic component. Alternatively, microprocessor 18 may be formed of multiple components which work in concert with one another and which may be located near or adjacent to one another, or they may be located at disparate locations from one another.

Memory 20 is any form of a device that is configured to receive and store and facilitate retrieval of information, such as data, instructions, software 22 or the like. Memory 20 may be formed of a hard drive, flash, RAM or the like or any combination thereof. Memory 20 may be formed of a single electronic component. Alternatively, memory 20 may be formed of multiple components which may be located near or adjacent to one another, or they may be located at disparate locations from one another. Memory 20 may be formed of a part of microprocessor 18. Or, alternatively microprocessor Software 22 is any form of information, data or computer instructions that facilitate the control of microprocessor 18 and/or control system 16 and/or vehicle 12. Software 22 includes computer programs, instructions, executable data, executable code, firmware, machine language instructions, or any combination thereof. Based upon the software 22, microprocessor determines how to process the information it receives and outputs commands accordingly. Software 22 for vehicle 12 may be formed of multiple components stored in multiple locations and run by multiple components.

In the arrangement shown, system 10 includes a wireless communications module 24. Wireless communications module 24 is formed of any suitable size, shape and design and is configured to facilitate wireless communications between vehicle 12 and third party provider 36. In one arrangement, as is shown, as one example, wireless communications module 24 is electronically connected with control system 16 of vehicle 12 as well as with antenna 26. Wireless communications module 24 facilitates the transfer of information and/or power between two or more unconnected components through over the air communication. Wireless communications module 24 utilizes radio waves, or RF communication. Wireless communications module 24 may facilitate communication over any one of, or a plurality of, wireless communications protocol and may include AM RF, FM RF, cellular communication protocol(s), Wi-Fi, Bluetooth, ZigBee, Z-wave, a mesh network or any other form of wireless communications protocol or scheme or any combination thereof. In one arrangement, Wireless communications module 24 facilitates communication over a plurality of these networks and/or a plurality of these communication protocols or bands. Doing so provides the Wireless communications module 24 with increased capabilities in that facilitating communication over a number of pathways allows for increased up-time, higher connectivity, and better consistency and robustness.

In one arrangement, wireless communications module 24, also known as a radio is any form of a device which receives wireless control signals from antenna 26, filters the wireless control signals, processes them into a usable form and then forwards on the processed signals as output to microprocessor 18. When wireless communications module 24 is a one-way device, meaning it facilitates one-way communication, meaning it only receives signals from antenna 26 and forwards them on to microprocessor 18, wireless communications module 24 is known as a receiver. When wireless communications module 24 is a two-way device, meaning it facilitates two-way communication, meaning it not only receives signals from antenna 26 and forwards them on to microprocessor 18 but it also receives signals from microprocessor 18 and processes them and transmits or broadcasts them through antenna 26, wireless communications module 24 is known as a transceiver.

Antenna 26 is any form of a device that receives and/or sends wireless signals and transfers them to other components, such as wireless communications module 24. When operating in a reception mode, antenna 26 receives wireless signals that are broadcast over the air and transfers these signals to wireless communications module 24 or other components of the system 10. When operating in a broadcast mode, antenna 26 receives signals and broadcasts them over the air to components such as cellular communications tower 30 or router 32 over wireless network 28, which may include a plurality of nodes and/or repeaters.

Wireless Network:

In the arrangement shown, system 10 includes wireless network 28. Wireless network 28 is formed of any suitable size, shape and design and is configured to facilitate the wireless communication between vehicle 12, or more specifically wireless communications module 24, antenna 26 and control system 16 of vehicle 12 with third party provider 36 over the internet 34 and/or through the cloud 62. In one arrangement, as is shown, as one example, wireless network 28 is a computer network that facilitates the transfer of information and communications between network nodes through, in part, over the air communication. Network nodes may include the wireless communications module 24, antenna 26 and control system 16 of vehicle 12, cellular communications tower 30, router 32, repeater 64 or any other wirelessly or hardwired or wireless and hardwired connected device that is capable of communicating over the wireless network 28.

Wireless network 28 operates utilizing radio frequency (RF) communication and facilitates communication over any one of, or a plurality of, wireless communications protocols and including AM RF, FM RF, cellular communication protocol(s), WiFi, Bluetooth, ZigBee, Z-wave, a mesh network or any other form of wireless communications protocol or scheme or any combination thereof. Wireless network 28 may be any of or a combination of a cell phone network, a wireless local area network (WLAN).

In one arrangement, wireless network 28 is a wireless personal area network (WPAN) which connects internet devices within a relatively small area. This may include the use of Bluetooth radio and invisible infrared light for interconnecting a components, ZigBee, Wi-Fi or any other protocol.

In one arrangement, wireless network 28 is a wireless local area network (WLAN) that links two or more devices separated by a distance using a wireless distribution method, usually providing a connection through an access point (such as repeater 64 or router 32) for internet access. The use of spread-spectrum or orthogonal frequency-division multiplexing (OFDM) technologies allows around and within a local coverage area while remaining connected to the wireless network 28.

In one arrangement, wireless network 28 is a wireless ad hoc network, also known as a wireless mesh network or mobile ad hoc network (MANET) which is a wireless network made up of radio nodes organized in a mesh topology. Each node forwards messages on behalf of the other nodes and each node performs routing. Ad hoc networks can "self-heal", automatically re-routing around a node that has lost power or communication. Various network layer protocols are used to realize ad hoc mobile networks, such as Distance Sequenced Distance Vector routing, Associativity-Based Routing, Ad hoc on-demand Distance Vector routing, and Dynamic source routing.

In one arrangement, wireless network 28 is a wireless wide area network which is a wireless network that typically cover large areas. A typical system contains base station gateways, access points and wireless bridging relays. Other configurations are mesh systems where each access point acts as a relay also.

In one arrangement, wireless network 28 is a cellular network or mobile network which is a radio network distributed over land areas called cells, each served by at least one fixed-location transceiver, known as a cell site or base station or cellular communications tower 30. In a cellular network, each cell characteristically uses a different set of radio frequencies from all their immediate neighboring cells to avoid any interference. When joined together these cells provide radio coverage over a wide geographic area. This enables a large number of portable transceivers (e.g., mobile phones, vehicle 12, etc.) to communicate with each other and with fixed transceivers and telephones anywhere in the network, via base stations, even if some of the transceivers are moving through more than one cell during transmission.

Wireless network 28 may be any other form of a network, or may be a combination of any of these and other networks and facilitates communication with the internet 34 and/or the cloud 64.

Wireless network 28 includes the use of one or more cellular communications towers 30, routers 32 and repeaters 64. Cellular communications tower 30 is formed of any suitable size, shape and design and is configured to facilitate communication over the internet 34 and over the wireless network 28 through the use of cellular communication. Router 32 is formed of any suitable size, shape and design and is configured to facilitate communication over the internet 34 and over the wireless network 28 through the use of wireless and wired communication. Repeater 64 is formed of any suitable size, shape and design and is configured to receive and repeat wireless communications between components of the wireless network 28.

Third Party Provider:

In the arrangement shown, system 10 includes a third party provider 36. Third party provider 36 is formed of any suitable size, shape and design and is configured to facilitate a user's ability to purchase additional horsepower on demand from their vehicle 12. In one arrangement, as is shown, as one example, third party provider 36 includes a module 38, database 40, software 42, vehicle accounts 44, user accounts 46 and an interface 48 among other components.

Module 38 facilitates processing of third party provider 36 and facilitates a user 50 to purchase additional power from their vehicle 12. Module 38 includes software 42 which consists of data, computer instructions, executable code, machine language, firmware and/or computer code that guide the manner in which module 38 operates and responds to given inputs. Module 38 is any device which facilitates the processing of information, such as a processor, central processing unit or a combination of processors and processing members. Module 38 is connected with one or more databases 40 that store information that facilitates the operation of module 38, including information related to vehicle accounts 44 and user accounts 46. Database 40 is any component or system that receives, stores and facilitates the retrieval of information such as a server, which may be cloud 62 based, hard drives or the like. Module 38 and database 40 facilitate the establishment of vehicle accounts 44 and user accounts 46 and the utilization of the vehicle accounts 44 and user accounts 46 in the system 10.

Vehicle accounts 44 include the necessary information on vehicles 12 that are part of the system 10. This may include the vehicle's unique ID number, of VIN number or other identification 66. This may also include this the configuration of the vehicle 12, such as model, motor size, present software or firmware version, the present state of the vehicle 12 (such as modifications, location), information as to how to connect to vehicle 12, such as routing details, ISP address or the like, who the user 50, owner, controller or administrator of the vehicle 12 is, and any other needed or helpful information to implement the system 10.

User accounts 46 include the necessary information on users 50 that are part of the system 10. This may include their name, address, their associated vehicle 12, information on their payment method 60, other authorized users of vehicle 12, and any other needed or helpful information to implement the system 10.

Third party provider 36 and module 38 also includes one or more user interfaces 48. User interface 48 is any system or configuration that allows for human and/or machine interaction with third party provider 36 and module 38 so as to facilitate control of the third party provider 36 and module 38. In one arrangement, interface 48 may be a website or webpage that allows a user 50 to directly interact with third party provider 36 and module 38 and allows the user 50 to purchase additional power using an internet enabled device 68 such as a phone 70, laptop computer 72, a desktop computer 74, a tablet computer 76, or any other computing device without human interaction. Alternatively, in one arrangement, interface 48 may be a website page that allows an employee, operator, user or other person associated with the system 10/third party provider 36 to directly interact with third party provider 36 and module 38 and allows the user 50 to purchase additional power by calling or otherwise contacting the third party provider 36. Alternatively, in one arrangement, interface 48 may be an electronic system that allows the user 50 to purchase additional power by calling or otherwise contacting the third party provider 36 directly using their phone 70 without human interaction. Interface 48 is any other manner, method or means or configuration of a device that facilitates interaction with third party provider 36 and/or module 38.

In one arrangement, interface 48 is hosted upon, by and/or in an internet enabled device 68 positioned within the vehicle 12, such as on an in-vehicle display 78 or other screen or interface that is part of vehicle 12. This arrangement enables efficient presentation of the horsepower on-demand system 10 to the user 50 at the place where they need the additional power—that is in the vehicle. The in-vehicle display 78 may be an application (also known as an app) that may be displayed on or accessible through the in-vehicle display 78. In one arrangement, the user 50 can access the interface 48 on in-vehicle display 78 when they know they need to purchase additional power. In one arrangement, when the vehicle control system 18 detects that the vehicle 12 is struggling or straining, the vehicle control system 18 is capable of displaying the interface 48 and reminding the user 50 that they can purchase additional power from system 10. This arrangement has the potential to increase utilization of the system 10, increase sales for third party provider 36, and provide improved performance for the user 50 and vehicle 12.

In an alternative arrangement, interface 48/in-vehicle display 78 is a button or other interface that is located within the cab of vehicle 12 and is connected with an audible system of the vehicle 12. In one arrangement, when the user 50 wants to purchase additional power, the user presses or interacts with the interface 48/in-vehicle display 78. Upon doing so, the control system 16 and wireless communications module 24 connects the user 50 with the third party provider 36 through the audible system of vehicle 12. In one arrangement, the user 50 is connected directly to a representative of third party provider 36 through live voice communication that facilitates the real-time purchase of additional power. Alternatively, the user 50 is connected to an automated, albeit voice-controlled, electronic system of third party provider 36 that can be used to order additional power. This arrangement is not unlike the On Star system wherein a user presses the On Star button within the cab of the vehicle and is wirelessly connected to an On Star representative who provides assistance. However, On Star cannot provide additional power to vehicle 12.

User & Communication Device:

In the arrangement shown, system 10 includes one or more users 50, who are owners, controllers and/or operators of vehicle 12. Users 50 communicate with the system 10 through the use of an internet enabled device 68 such as a phone 70, laptop 72, desktop 74, tablet 76 and/or through in-vehicle display 78 which connects to third party provider 36 and module 38 through wireless network 28 and/or the internet 34 and/or the cloud 62.

In Operation:

When user 50 is considering the purchase of vehicle 12 the horsepower on demand system 10 affords them the ability to purchase vehicle 12 at a lower power output (a first predetermined power output, or a first predetermined maximum power output), while allowing the user 50 to increase the power output of vehicle 12 on demand. This allows user 50 to endure a lower up-front cost, while retaining all the capabilities of the vehicle 12, albeit the user 50 will have to purchase increased performance at a later date if they so desire.

As an example, when user 50 needs more power, for instance when they know they are going to be plowing a large field with a large implement for the next three days, the user 50 pre-purchases additional power using system 10.

Call:

In one arrangement, user 50 calls third party provider 36 using their phone 70 and they talk to an employee, operator, user or other person associated third party provider 36 who helps user 50 purchase additional power (a second predetermined power output, or a second predetermined maximum power output, which is greater than the first predetermined power output, or first predetermined maximum power output), for a predetermined amount of time. In this arrangement, the employee, operator, user or other person associated with third party provider 36 interacts with interface 48 and establishes a user account 46 and enters the needed information such as name, address, vehicle 12, payment method 60, etc. The user account 46 is connected with the vehicle account 44. The user 50 selects the additional amount of power they choose to purchase and the duration of time they desire to purchase. Upon completion of entry of all the information, the payment is transferred through the payment method 60, such as a credit card or the like.

Upon completion of the purchase, a control signal or control signals are transmitted by third party provider 36 through the internet 34 and/or the cloud 62 to vehicle 12. This signal may transmit through cellular communications tower 30, router 32, repeater 64 and/or over wireless network 28. The control signal is received by antenna 26 and transmitted to control system 16 of vehicle 12. Upon receiving this control signal, the microprocessor 18 processes the information in the control signal according to instructions and/or software 22 stored in memory 20 and the control system 16 makes the needed changes to the vehicle 12 to facilitate the implementation of providing additional power. As examples control system 16 may increase the horsepower output of engine 14 by adjusting fuel flow, adjusting timing, adjusting boost from a turbo charger or super charger, adjusting valve timing, adjusting spark timing, adjusting air flow, adjusting exhaust flow, or adjusting any other controllable aspect of engine operation thereby providing the purchased amount of additional power. As such, during the purchased period of time, the user 50 enjoys the use of vehicle 12 with an increased amount of power thereby improving the performance of the vehicle 12 and expanding the capabilities of vehicle 12 during the purchased time period.

Upon expiration of the purchased time period, third party provider 36 transmits a control signal in a same or similar manner described above that reverts the performance characteristics of vehicle 12 to the prior settings once received by vehicle 12.

Direct Connection Through Interface:

In an alternative arrangement, instead of calling third party provider 36, the user 50 directly connects to third party provider 36 through internet enabled device 68 using interface 48. In this arrangement, internet enabled device 68, which may be any of phone 70, laptop computer 72, a desktop computer 74, a tablet computer 76 and/or an in-vehicle display 78 displays interface 48 and connects over wireless network 38, internet 34 and/or the cloud 62 to third party provider 36. Once connected, the user 50 enters the needed information, as is described in the manner above and selects the power output they desire and the duration of time. Upon completion of the purchase, a financial transaction occurs through or using the payment method 60, such as a credit card being charged. Once the payment is made the third party provider 34 initiates the transfer of a control signal to vehicle 12 in the manner described above.

Machine Learning and Predictive Analysis:

In one arrangement, system 10 is enabled to suggest to the user 50 when they should purchase additional power through system 10 based on the recent use patterns of vehicle 12. That is, control system 16 monitors the performance of vehicle 12 and analyzes the performance of vehicle 12. When this analysis detects that additional power is needed, such as the vehicle 12 is overly straining to perform, the system 10 suggests to the user 50 that it would be beneficial for them to purchase additional power. This may be through a message sent to the user's internet enabled device 68, which may be any of a phone 70, laptop computer 72, a desktop computer 74, a tablet computer 76, or the like, in the form of a text message, an email, or the like. In an alternative arrangement, this message is displayed on the in-vehicle display 78 in real-time, and/or an audible message is transmitted in the cab of the vehicle 12 for the user to hear, which may be an voice message or simply tones that indicate that additional power should be purchased. In this message, the benefits of purchasing increased power is provided and explained to the user 50 such as increased speed, improved fuel economy and the like. In this way, the system 10 itself, using machine learning and predictive analysis, can suggest to the user 50 ways that they can harness better performance out of their vehicle 12. This is particularly efficient and handy when the messaging is provided directly on the in-vehicle display 78 within the vehicle 12 while the vehicle 12 is operating.

Manufacturer:

Vehicle 12 is manufactured by one or more manufacturers 80. As one example, it is manufacturer 80 that controls the configuration and assembly of vehicle 12 and its ability to provide varying power output. In one arrangement, when manufacturer 80 manufactures vehicle 12, manufacturer 80 embeds an unlock code 82 in the control system 16, microprocessor 18, memory 20, software 22 or any other component of the vehicle 12 that can be used to unlock or modify the power output of engine 12 in the manners described herein. Manufacturer 80 also includes all the needed componentry and systems to facilitate the horsepower on demand functionality.

In one arrangement, manufacturer 80 and third party provider 36 are affiliates of one another or are one and the same. That is, third party provider 36 is a customer service branch, or service branch of manufacturer 80 that facilitates the horsepower on demand functionality. As such, when third party provider 36 receives payment 60 from user 50, manufacturer 80 receives the benefit of building the system 10 and putting the additional functionality in place. In this arrangement, manufacturer 80 gets paid payment 60 directly from users 50 for increased performance. In this way, manufacturer 80 recoups the cost of building and facilitating the system 10 and capitalizes on the capabilities it has installed on vehicle 12.

In another arrangement, manufacturer 80 and third party provider 36 are separate entities. In this arrangement, manufacturer 80 manufactures vehicle 12, manufacturer 80 embeds an unlock code 82 in the control system 16, microprocessor 18, memory 20, software 22 or any other component of the vehicle 12 that can be used to unlock or modify the power output of engine 12. Manufacturer 80 also includes all the needed componentry and systems to facilitate the horsepower on demand functionality. Manufacturer 80 then sells or transfers the information contained within or needed for the vehicle account 44, such as the vehicle's identification number 66, configuration, model, location, unlock code 82 and any other necessary or useful information, to the third party provider 36. Using this information, third party provider 36 is capable of increasing the horsepower output of vehicles 12 that are part of the system 10. Third party provider 36 then essentially sells this information and/or capability to users 50 in return for subscription fees or licenses from users 50 who need or desire increased performance from their eligible vehicle. In return for receiving this information and capability from manufacturer 80, third party provider pays manufacturer 80 a license fee, a royalty fee or any other form or amount of payment. In this way, manufacturer 80 recoups the cost of building and facilitating the system 10 and capitalizes on the capabilities it has installed on vehicle 12. This arrangement provides the benefit to manufacturer 80 that it does not have to administer the operation of the system 10, it only has to enable the functionality within the vehicle 12 and allow third party provider 36 to administer the system 10.

Dealer:

In one arrangement, the system 10 includes a dealer 84. In this arrangement, dealer 84 is any entity that that interfaces with user 50 and gets the vehicle 12 in the hands of user 50.

In one arrangement, dealer 84 is the intermediary between the manufacturer 80 and the user 50. In this arrangement, the dealer 84 facilitates the sale of vehicle 12 to the user 50, such as working with the user 50, negotiating the price and sales terms, facilitating payment and financing, transferring title, providing maintenance and support services, and the like. In one arrangement, dealer 84 is also the intermediary between the user 50 and the third party provider 36. In this arrangement, dealer 84 facilitates the sale of the horsepower on demand services of third party provider 36 to user 50. In this arrangement, dealer 84 educates the user 50 regarding the horsepower on demand capabilities of vehicle 12 and enrolls user 50 into the system 10. In one arrangement, in return for being the sales person and interfacing with the user 50, dealer 84 is paid a portion of the payment 60, such as a flat fee for enrollment of the user 50, a royalty rate for the sales that occur, and or any other fee or payment amount.

In one arrangement, dealer 84, manufacturer 80 and third party provider 36 are all the same entity, or are branches of the same entity. In another arrangement, dealer 84, manufacturer 80 and third party provider 36 are all separate entities or independent entities.

Power Tracking & Power Mapping:

In one arrangement, system 10 is enabled to track the power used by vehicle 12 in association with the position of the vehicle 12. In one arrangement, vehicle 12 tracks its position through the use of a global positioning system (GPS) which may be associated with antenna 26 and communicated through wireless communications module 24 in association with control system 16. While GPS is mentioned herein, any other form of a telemetry system or positioning system is hereby contemplated for use. In one arrangement, vehicle 12 tracks the power used by vehicle 12 by use of a sensor 86. Sensor 86 may be a physical sensor and/or a software sensor or other electronic sensor or sensing arrangement or sensing system or the like.

In one arrangement, the power used by vehicle 12 is associated with the position of vehicle 12 through this mapping feature. In one arrangement, this associated power usage and position is stored onboard vehicle 12 in control system 16, whereas in another arrangement the associated power used and position of the vehicle 12 is transmitted through antenna 26 to third party provider 36, whereas in another arrangement, the associated power used and position of the vehicle 12 is both stored and used onboard vehicle 12 as well as being transmitted to third party provider 36 for further processing, manipulation and analyzation. Any other arrangement of collecting, storing, tracking and transmitting the position and power information is hereby contemplated for use.

In one arrangement, regardless of where the information regarding the power used by vehicle 12 in association with a position of the vehicle 12 is stored, onboard and/or transmitted to third party provider 36, maps 88 are generated using this information thereby providing visual indication of the power used by vehicle 12 in association with the position of vehicle 12. This arrangement is particularly well suited for agricultural applications wherein vehicle 12 is used to perform an agricultural operation, such as harvesting, spraying, tilling, chiseling, cultivating, plowing, spreading, chopping, bailing, planting, fertilizing, and the like within the boundaries of an agricultural field 94. In this arrangement, the system 10 provides a visual indication of the power used by vehicle 12 throughout the agricultural field 94. This information may be used, as is described herein, to suggest an optimum power output level for vehicle 12 so as to maximize performance, minimize slippage, minimize wear and tear on vehicle 12, minimize wear and tear on the field, minimize fuel consumption, and maximize speed of operation among other advantages. This information may also be used to select the proper vehicle 12 and/or power setting of vehicle 12 in association with a given implement 92 and/or operation. This information may also be used to select the proper implement 92 to be used in association with the farming operation. This information may also be used to select the proper implement 92 in association with a given vehicle 12 and/or power setting of vehicle 12 implement 92 and/or operation.

In one arrangement, system 10 includes a sensor 90 associated with vehicle 12 that senses the attachment of an implement 92 to vehicle 12. In one arrangement, sensor 90 may be a physical sensor and/or a software sensor or other electronic sensor or sensing arrangement or sensing system or the like that is configured to sense the attachment of implement 92 to the vehicle 12 and/or control system 16. In one arrangement, implement 92 includes a tag which is read by sensor 90 which is a reader, similar to or identical to a radio-frequency identification (RFID) arrangement which uses electromagnetic fields from a sensor (e.g. sensor 90) to automatically identify and track tags attached to objects (e.g. implement 92). In one arrangement, when implement 92 is attached to vehicle 12 and/or control system 16 sensor 90 senses the attachment of implement 92 and automatically enters the parameters of implement 92 into the system 10. These parameters may include the make, model, weight, width, number of rows, configuration, type of implement, number of wheels or any other information known about this implement 92, or the like information. This information may be stored on the tag attached to the implement 92 and electronically transmitted to or detected by sensor 90 and/or control system 16. Alternatively, this information may be associated with a unique ID stored on the tag and once the sensor 90 detects the presence of the implement and its unique ID, control system 16 determines from a database (either an internal database or an external database 40) the parameters associated with the implements unique ID. In an alternative arrangement, upon attachment of the implement 92 to vehicle 12, the user may manually enter the parameters of implement 92. In one arrangement, sensor 90 may be an arrangement wherein implement 92 includes a microchip or other electronic device that includes stored information therein or thereon, such as a memory chip, such that once implement 92 is attached and/or electrically connected to vehicle 12, system 10 of vehicle 12 detects the presence of this microchip or memory and accesses the information contained on the chip which indicates the relevant information to the system, such as the make and model of implement 92 and its relevant parameters and any other information. The presence of implement 92 and the identification of its parameters may be determined by any other manner, method or means.

In another arrangement, vehicle 12 and implement 92 communicate using Bluetooth or another wireless communication system and/or protocol. In another arrangement, implement includes a wired connection, such as a serial BUS or other wired component or connection that connects control system 16 of vehicle 12 to the control system, sensor structure, and/or other electronic components of implement 92. When this connection, whether wired or wireless, is made between implement 92 and vehicle 12, horsepower on demand system 10 senses the connection, and senses and/or determines the parameters of the implement 92 which may include the make, model, weight, width, number of rows, configuration, type of implement, number of wheels or any other information known about this implement 92, or the like information. This information may be stored on a memory device or other electronic device of implement 92. When the connection is wired, the connection may be used to carry power as well as operational control signals between control system 16 of vehicle 12 and implement 92. During operation of motor vehicle 12 and implement 92, information transmitted between control system 16 of vehicle 12 and implement 92 may be used by the horsepower on demand system 10 to associate horsepower demands with not only the implement 92 that is being used, but the ways in which the implement 92 is being used. Other sensors 90 may also be used in association with this system such as slope, angle, direction, centripetal force, acceleration, fuel consumption, vibration, and any other sensor. The system 10 may also incorporate a photo or video recording system that takes pictures of the soil, which are then associated with the map of the field and overlaid with the information collected by the system, such that when a map 88 is zoomed into an actual picture of each portion of the field can be seen by the user. This provides a user with an unprecedented level of information and detail regarding their fields.

As an example, when implement 92 is a planter, horsepower on demand system 10 tracks when the planter is in a folded condition, when it is in an extended position, when it is in a planting (lowered) mode, when it is in a non-planting (raised) mode, the weight of the seed being carried, and/or any other condition. Horsepower on demand system 10 may also track these conditions in association with the position of use so that that this information may be overlaid as a condition of the horsepower demand maps 88. This conditional use information may be used by horsepower on demand system 10 to better predict the power needs of a particular use, field, vehicle 12, implement 92 and/or any combination thereof.

Figure 2:
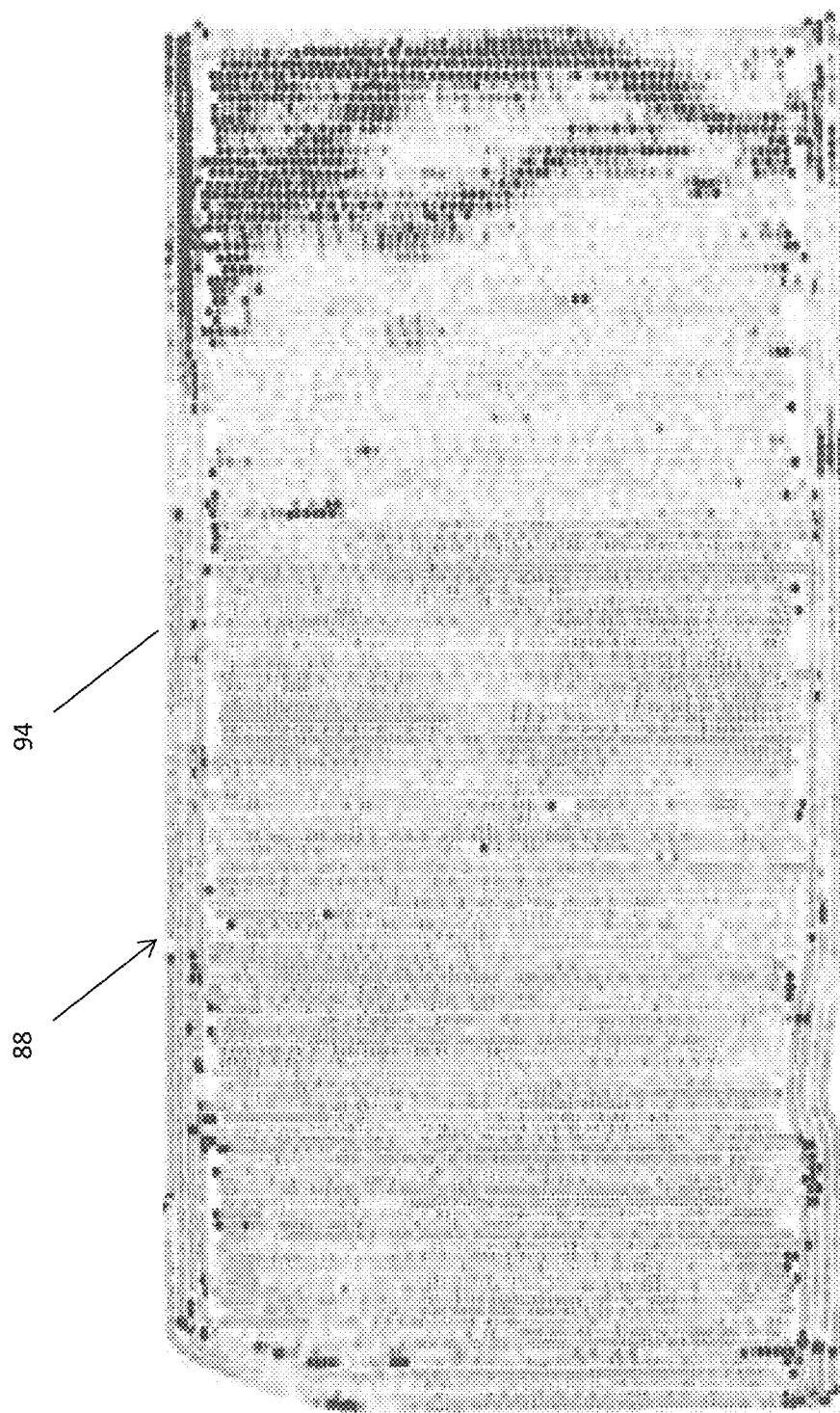
FIG. 2 is a plan view of a map of an agricultural field with horsepower information overlaid on the map.

With reference to FIG. 2, an exemplary map 88 is presented that shows the power used across the agricultural field 94 in a gradient that correlates to the power used as is sensed by sensor 90. These maps 88 may be created across the various agricultural operations, such as: planting, harvesting, spraying, tilling, chiseling, cultivating, plowing, spreading, chopping, mowing, bailing, fertilizing and the like, for each of the agricultural fields 94 that a user operates vehicle 12 in. These maps 88 then may be used to suggest equipment purchases, such as new vehicles 12 and implements 92 so as to ensure that the optimum equipment is being purchased. That is, the power-usage field maps 88 may be used to ensure that future equipment changes are optimally efficient and correlate to the agricultural fields 94 the equipment is used in. This ensures that the user does not purchase larger or more-powerful equipment than is needed or than can be operated efficiently. This also ensures that the user does not purchase smaller and less efficient equipment than may be used or is needed. This arrangement will make equipment changes and equipment upgrades and equipment purchases more efficient, less stressful and less risky. These maps 88 may also be used to effectively plan equipment changes far out into the future with confidence based on the data contained within the maps 88.

In addition, data contained within the maps 88 may be used to predict the power requirements across the agricultural fields 94 for each piece of new equipment or implement 92 before it is purchased or actually used. That is, if a user is interested to know how a new planter will fit into their farming operation, or how a new piece of tillage equipment may operate with their existing equipment, the maps 88 and the data contained therein, may be used to predict power requirements, fuel consumption, performance and other parameters and characteristics across any one or all of the user's agricultural fields 94. From this information, the user can make informed decisions whether to purchase or not purchase the piece of equipment. This information and this process may also be used to make informed decisions about the user's equipment roadmap.

Furthermore, as the power output of vehicle 12 may be changed, by purchasing more power through system 10, these maps 88 may be generated based on various power outputs of vehicle 12. These predictive maps 88 may show the user the benefits of purchasing more power through system 10. If it is determined that more power is needed, beneficial or desired, the user may then use system 10 to purchase the desired additional power. As yet a further step, the maps 88 may be used to purchase more power within certain fields or certain portions of an agricultural field 94, which would not be unlike varying see density or fertilizer density across an agricultural field 94, thereby reducing the amount of power that must be purchased and reducing the amount of cost to the user.

In one arrangement, the gradient used in the maps 88 may be the actual amount of power used by position. In another arrangement, the gradient used in the maps 88 may be how close the vehicle 12 is to being red-lined or maxed-out by position. In another arrangement, the gradient used in the maps 88 may be how efficient the vehicle 12 is operating by position. Any other gradient or calculation or other information may be displayed by position on map 88 that relates to the power used by vehicle 12.

Power Tracking Over Time:

In one arrangement, system 10 is configured to track the power and/or fuel used by vehicle 12, as well as practically any other characteristic of operation in association with particular setups of the system 10, over time to determine whether there has been a change in efficiency over time. That is, machinery ages and due to wear and tear machinery tends to be less efficient over time. This is particularly true in agricultural operations wherein the machinery is often used in harsh and high-contact conditions that are dirty and abrasive and rough. In one arrangement, system 10 is configured to track the efficiency of various setups or configurations over time to determine whether there has been a change in the operational efficiency over time. These parameters that may be tracked over time may include fuel consumption, speed, wheel slippage, RPMs, horsepower used, torque applied, or any other condition or parameter or any combination thereof. From this information various conclusions may be made, or at a minimum a determination can be made that something is wrong as efficiency has been lost and therefor diagnostics and/or an inspection of the vehicle 12, implement 92 or any other part of the system 10 should be performed.

As one example, system 10 is used by Farmer A with a particular 7-Series John Deere tractor Serial No. ###, ### as vehicle 12 and 30-foot wide John Deere field cultivator Serial No. ###, ### as implement 92. Over time, system 10 tracks various operational parameters of this vehicle 12 when used with this implement 92, such as fuel consumption, speed, wheel slippage, RPMs, horsepower used, torque applied over time, among other parameters. In this arrangement, during use, system 10 tracks these parameters and establishes a baseline for each parameter. The system 10 also establishes various statistical limits, such as moving averages, confidence intervals, and the like. As such, Farmer A can track the efficiency of operation of this combination of vehicle 12 and implement 92 over time to determine how much loss of efficiency there has been due to wear and tear over time. The system 10, may also inform Farmer A when there has been a spike (which could be an increase or decrease, depending) in any parameters or combination of parameters, indicating a relatively sudden, dramatic or catastrophic change in operational efficiencies. The system 10, may also inform Farmer A when there has been a slow and gradual change (which could be an increase or decrease, depending) in any parameters or combination of parameters, indicating that wear and tear has taken its toll and there has been a slow loss of efficiencies. In either case, the system 10 may indicate to the Farmer A that an inefficient or less-than optimally-efficient situation is at hand with vehicle 12 and/or implement 92 and therefore providing Farmer A with the information necessary to address the situation. This may allow Farmer A to inspect vehicle 12 and/or implement 92, repair vehicle 12 and/or implement 92, perform diagnostics on vehicle 12 and/or implement 92, take vehicle 12 and/or implement 92 to the dealer or other repair shop, replace vehicle 12 and/or implement 92, and/or take any other necessary step. This enables Farmer A to maximize efficiencies and minimize inefficient operations.

As one example, system 10 may alert Farmer A of a sudden spike, or slow increase, in tire slippage. This may be due to the tires of vehicle 12 finally wearing down over time to a point where they are affecting performance of vehicle 12. With this information, Farmer A can replace the tires. As another example, system 10 may alert Farmer A of a sudden reduction, or slow reduction, in the required horsepower and/or required torque to pull implement 92 through the field. This may be due to the shovels, discs, tines or other ground-engaging components wearing away over time thereby causing less drag as well as causing less-effective tillage. With this information, Farmer A can replace the shovels, tines, discs or other ground-engaging components of implement 92. As another example, system 10 may alert Farmer A of a sudden increase, or slow increase, in the fuel consumption of vehicle 12. This may be due to the general wear and tear on vehicle 12 or any of the components of vehicle 12, such as the engine, fuel system, tires, transmission or the like. With this information, Farmer A can perform a detailed inspection of vehicle 12, take vehicle 12 to the dealer or shop and have diagnostics performed on vehicle 12 and/or have the vehicle 12 repaired and/or have maintenance performed.

In one arrangement, to provide increased accuracy of when system 10 indicates to a user that efficiencies have changed, the system 10 uses algorithms, software, artificial intelligence or any other manner or method of computing to reduce the effect of various variables on the determination whether efficiencies have changed. For instance, in one arrangement, system 10 correlates the efficiency information with the mapping function to correlate the efficiency information with the particular fields 94. In doing so, a reduction in fuel efficiency, which is due, for example, due to a particularly rocky field 94, does not cause an alert. Instead, correlating efficiency information to the mapping function and particular fields 94 allows system 10 to strip-out variability due to fields 94. In this way, more accurate results are provided, and fewer false alarms occur.

In one arrangement, to provided increased accuracy of when system 10 indicates to a user that efficiencies have changed, the system 10 uses algorithms, software, artificial intelligence or any other manner or method of computing to reduce the effect of various variables on the determination whether efficiencies have changed. For instance, in one arrangement, system 10 correlates the efficiency information with information from sensors 86, 92 to help reduce the effect that various variabilities have on the efficiency information. As one example, system 10 takes into account the moisture of the soil as sensed from a sensor 86, 92 as soil moisture can dramatically effect wheel slippage, drag, ease of tillage, etc. Any other parameter, variable or information may be correlated with any efficiency information to ensure accurate indication when efficiencies have been lost due to changes in vehicle 12 and/or implement 92 instead of due to variances in variables.

The combination of yield, fuel consumption, horsepower applied, torque applied, soil mapping, moisture, and any other information or parameter tracked will help the operator farmer make more informed decisions and more appropriate decisions to utilize fuel consumption, crop management, which crops to use and the selection of equipment and farming techniques. This will lead to greater profitability, less crop disasters, increased soil quality, increased time efficiency, increased monetary profitability, less losses, and an overall higher level of confidence when making decisions at the present and into the future.

Crowd Sourcing Information:

In one arrangement, having horsepower on demand system 10, along with the mapping function, may be used across the entire installed base of systems 10 to compare various vehicles 12 and implements 92 to determine which vehicle 12, implement 92 or other component or combination of components is more efficient, and which is less efficient, across a broad array of parameters. That is, in one arrangement, the information from multiple installed systems 10 can determine over a vast amount of usage by various users across multiple fields and many acres in different locations which implements 92 are more efficient from a power-consumption perspective and/or a fuel consumption perspective, or any other perspective.

As an example, all Kinze planters can be compared to all John Deere planters, or more specifically, all twelve-row Kinze planters can be compared to all twelve-row John Deere planters. From this comparison, the system 10 can provide information as to which type of planter is more efficient from the perspective of a horsepower demand, fuel consumption, speed, wheel slippage, torque, or any other perspective. This information can even be overlaid with related maps to determine which planter provides a greater harvested yield. That is as an example, the system can provide a comparison such as on average Kinze twelve-row planters require 4% less horsepower, 5% less fuel consumption but yield 2% less bushels per acre as compared to John Deere twelve-row planters. This information then can be compared to the relative cost of a Kinze planter to a John Deer planter, along with other parameters such as distance to a dealer for repairs and the like, coupled with the number of acres planted each year, to make the determination as to which is the most cost-effective piece of equipment to purchase. This takes the guess-work out of the decision by applying the information from system 10. The system 10 can even calculate the number of acres for a break-even point between the planters based on present fuel and crop prices.

This information and the correlations it can be narrowed down to any relevant subset of information, such as year, make, model, geographic use, crop, type of tire used, or any other parameter to ensure to provide the most accurate and desired subset of information. This information can also be provided as granular as the brand of hybrid planted, the specific hybrid planted, the type of fertilizer used, the soil type, or any other level of information available.

This information can then be used to select the optimum implement 92, vehicle 12, engine 14, or any other piece of equipment or accessory or component to the equipment (e.g. tires, shovels, stalk choppers, blades, disks, etc.). In addition, this information can be tied in with the CSR (Corn Suitability Rating), maps 88, or any other form of a soil map, for each field and each portion of the field to better predict and analyze the true CSR and ability or potential for that field and/or that portion of the field to raise a crop. Again, with this improved level of detail and new information the user can better make decisions regarding their particular operation from a macro perspective all the way down to a granular level.

Recreation of Maps:

One problem in the farming industry is that the soil maps are in many cases twenty-five to fifty years old, or even older, and therefore they may be out of date, inaccurate or entirely irrelevant. This means that the basis for farm purchases are made is often out of date. This means that the basis for farm management is often out of date.

In one arrangement, the system 10, by bringing together the information from existing (albeit out-of-date) government soil maps and combining them with the information from system 10, such as horsepower usage, wheel slippage, yield, photos of the actual soil, fertilizer application, seed application, the types of crops grown, the hybrid types grown, the cover crops applied, tillage work performed, the types of farming practices used, the types of equipment used, moisture levels, and any other information collected by system 10, the system 10 can generate more-accurate and more-valuable soil maps that provide an accurate representation of a farms CSR (Corn Suitability Rating), or in the case of fields that are not used to raise corn, another numerical representation or numerical representations of how capable the field is at raising a crop. This information may be at any level, from a macro overall field level, to foot-by-foot or even inch-by-inch. This highly accurate and highly detailed information may ultimately lead to the removal of the farmer's reliance on local agronomists or seed-salespeople as the system 10 can provide an information based and accurate suggestion as to what crops to plant, from the type off crop (e.g. corn or soybeans) to the manufacturer (e.g. Pioneer, Wyffels, Monsanto) to the hybrid itself (e.g. 3220, 3221, 3222), what tillage to perform and what equipment to use, what nutrients to apply and essentially any other information. The system 10 may incorporate the present as well as predicted market price for crops, as well as the price of inputs and the estimated input needs to generate these suggestions to maximize profits. The system 10 can also generate calendars identifying the timing of various steps, such as when to work the fields 94, when to plant, when to fertilize, when to spray, and the like to maximize outputs. This is due to the vast amounts of information the system 10 has access to and its ability to extrapolate results from varied practices and fields 94 enrolled in the system 10. The more the system 10 is used the broader the base of information the system 10 has to rely upon to make predictive determinations thereby making the predictions and suggestions by system 10 more accurate.

Route Planning:

With the information accessible by system 10, in one arrangement the system 10 may suggest route planning. That is, using maps 88 of the conglomerated data discussed herein, the system using algorithms, software, artificial intelligence or any other manner or method of computing, may provide the optimal manner of working a particular field 94. That is, system 10 may provide the direction planning for working a field 94 as well as how deep to plant the seeds, or far apart to plant the seeds, when and where and how much fertilizer to apply, what tillage steps to perform and to what degree, depth and manner, as well as suggest any other step and/or process. These suggestions are aimed at maximizing harvested yield while minimizing fuel consumption, maximizing safety, minimizing wear and tear on the equipment as well as the field, and maximizing the longevity of the field 94. Again, this highly accurate and highly detailed information may ultimately lead to the removal of the farmer's reliance on local agronomists or seed-salespeople as the system 10 can provide an information based and accurate suggestion as to how and what crops to plant, what tillage to perform and what equipment to use, what nutrients to apply and essentially any other information. This will increase the farmer' chance of success and maximize their potential for profitability.

Pictures of Actual Soil of the Field:

As mentioned herein, the system 10 may also incorporate a picture taking device that takes photos and/or videos of the actual soil of the field 94. These photos and/or video of the actual soil of field 94 are then associated with the map 88 of the field 94 and overlaid with the other information collected by the system 10. The information from the photos and/or video may be analyzed by various means to extrapolate information that may be used to improve farming practices that optimize profitability. In one arrangement, field maps 88 may be zoomed in until actual pictures and/or video of each portion of the field 94 can be seen by the reviewer. This provides a user with an unprecedented level of information and detail regarding their fields 94 and can help a user understand why yield was higher or lower in various places in the field 94. This information can also help the user and the system 10 plan farming operations.

As an example, when the pictures and/or video reveal a high level of rocks in one area, the user or system 10 can program to plant seeds at an increased distance to account for the lower quality soils and can also program to raise the cutting bar of a bean head an extra couple of inches to avoid engagement with the rocks in the field. As another example, software can be used to review pictures and/or video and perform analytics on the pictures and/or video to extrapolate information about the soil in various parts of the field 94, such as the soil type, soil content, CSR, organic content, inorganic content, and any other soil condition or the like.

In one arrangement, vehicle 12 includes one camera that is capable of taking photos at various intervals, such as every foot, every two feet, every three feet or the like for example, and/or a continuous video as the vehicle 12 drives through the field 94. This information is then recorded. In one arrangement, this camera is mounted to the front-center of the vehicle 12, or alternatively to the rear-center of the vehicle 12, however any other arrangement is hereby contemplated for use such as being positioned under vehicle 12, positioned to the side of vehicle 12 or any other position on vehicle 12.

In an alternative arrangement, multiple cameras are mounted to vehicle 12, across the width of vehicle 12, either in the front of vehicle 12 or at the rear of vehicle 12 or both in the front and in the rear. By placing multiple cameras across the width of the vehicle 12 pictures and/or video of different portions of the field 94 are recorded, adding to the detail or resolution level. These multiple cameras can be spaced across the width of the vehicle 12 either at the front, the middle, the rear or any other portion of the vehicle 12. By placing the cameras in front of the vehicle 12 the cameras may record information before the farming operation is performed, and by placing the cameras in the rear of the vehicle 12 the cameras may record information after the farming operation is performed, which can be different information, the comparison of which can yield valuable insight.

In an alternative arrangement, the camera or multiple cameras may be attached to implement 92 in the manner described herein. That is, implement 92 may have a single camera positioned at its forward side, rearward side, middle or any other position, or alternatively implement 92 may have multiple cameras positioned at its forward side, rearward side, middle or any other position, or both or any combination thereof. By placing cameras at the forward side of implement 92 this allows pictures and video to be taken of the field 92 prior to the farming operation performed by implement 92, and by placing cameras at the rearward side of implement 92 this allows pictures and video to be taken of field 92 after the farming operation has been performed. The contrast between these pictures may yield valuable insight regarding the soil content and structure and richness.

To be clear, it is hereby contemplated that one or more cameras may be associated with either or both vehicle 12 and/or implement 92 which may be placed at the front, rear, middle, across the width of, or any other portion of vehicle 12 and/or implement 92. Again, gathering photos and/or video from multiple points provides maximum and/or optimum amount of information is gathered.

Also, to be clear, while the term camera is used herein to take photographs and/or videos of the field 94, these photos and videos can be of any form. That is, these photos and/or videos may be of any resolution from low resolution to high resolution (such as 4K or the like). Also, these photos and/or videos may be in black and white, greyscale, and/or color. Also, these photos and/or videos may be of visual light, IR, or any other wavelength, each of which may provide different information.

From the above discussion it will be appreciated that the horsepower on demand system 10 accomplishes most, if not all, of the objectives set out herein. That is, the horsepower on demand system 10 improves upon the state of the art; allows a user to modify the amount of horsepower their vehicle produces; allows a user to purchase increased horsepower when needed; reduces the cost of purchase price of a vehicle; provides a purchaser of a vehicle with greater flexibility and options; is environmentally friendly; reduces emissions and energy consumption; reduces the cost of vehicle ownership; reduces the cost of vehicle operation; is easy to use; is efficient; can be used with any vehicle; can be used with any motor or engine; is cost effective; is safe to use; has a long useful life; provides functionality that did not previously exist; allows a user to modify the power output of their vehicle quickly; has a wide variety of; has a wide variety of applications; provides value; is relatively inexpensive; allows vehicle manufacturers to generate additional revenue, among countless other improvements and advantages.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the invention. It is intended that this invention be limited only by the following claims, and the full scope of equivalents thereof.

What is claimed:

1. A method of varying a power output of vehicle, the steps comprising:

operating a vehicle having a unique ID, an engine, a control system and a wireless communication module by a user at a first level of power output;

contacting a third party provider by the user;

purchasing an additional level of power for the vehicle by the user from the third party provider;

transmitting a first signal by the third party provider to the vehicle over an electronic network in response to the user purchasing the additional level of power from the third party provider;

increasing the power output of the engine of the vehicle by the control system upon receiving the first signal to a second level of power output, wherein the second level of power output is greater than the first level of power output.

2. The method of claim 1, wherein the user contacts the third party provider by calling the third party provider.

3. The method of claim 1, wherein the user contacts the third party provider through the internet.

4. The method of claim 1, wherein the user purchases increased power for a predetermined amount of time.

5. The method of claim 1, wherein the user purchases a predetermined amount of increased power.

6. The method of claim 1, further comprising the steps of:
transmitting a second signal to the vehicle after a predetermined amount of time;
reducing the power output of the engine of the vehicle by the control system in response to receiving the second signal.

7. The method of claim 1, wherein the third party provider includes a module having a database that facilitates connecting users to their vehicles using the unique ID of the vehicle.

8. A method of tracking power used by a vehicle, the steps comprising:
providing the vehicle having a unique ID, an engine, a control system and a wireless communication module;
operating the vehicle in an agricultural field to perform a farming operation;
tracking the power used by the vehicle in the agricultural field during a performance of the farming operation;
tracking the position of the vehicle in the agricultural field during the performance of the farming operation;
associating the power used by the vehicle in the agricultural field during the performance of the farming operation with a position of the vehicle in the agricultural field during the performance of the farming operation;
creating a field map of the power used by the vehicle in association with the position of the vehicle within the agricultural field.

9. The method of claim 8 further comprising the step of associating a picture taking device with the vehicle, taking pictures of the soil of the agricultural field during the performance of the farming operation, and associating the pictures of the soil of the agricultural field with the field map of the agricultural field.

10. The method of claim 8, further comprising the step of: associating an implement with the vehicle for use during the performance of the farming operation.

11. The method of claim 8, further comprising the steps of: providing a sensor associated with the vehicle, connecting an implement to the vehicle, and sensing the implement by the sensor.

12. The method of claim 8, further comprising the steps of: connecting an implement to the vehicle for use during performance of the farming operation and imputing parameters of the implement for tracking purposes.

13. The method of claim 8, wherein the farming operation is selected from the group of: planting, harvesting, spraying, tilling, chiseling, cultivating, plowing, spreading, chopping, mowing and bailing.

14. The method of claim 8, wherein the position of the vehicle is tracked using GPS and the power used is tracked using a sensor.

15. The method of claim 8, further comprising the step of suggesting an improved power output based on the field maps showing the power used by the vehicle.

16. A method of tracking the horsepower used by a vehicle, the steps comprising:
providing the vehicle having a unique ID, an engine, a control system and a wireless communication module, the vehicle having a predetermined first power output level;
operating the vehicle to perform an operation;
tracking the power used by the vehicle during performance of the operation;
suggesting second power output level based on past performance;
contacting a third party provider by a user;
purchasing additional power for the vehicle by the user from the third party provider;
transmitting a first signal by the third party provider to the vehicle over an electronic network in response to the user purchasing additional power from the third party provider;
increasing the power output of the engine of the vehicle by the control system of the vehicle upon receiving the first signal.

17. The method of claim 16, further comprising the step of: associating an implement with the vehicle for use during the performance of the operation.

18. The method of claim 16, further comprising the steps of: providing a sensor associated with the vehicle, connecting an implement to the vehicle, and sensing the implement by the sensor.

19. The method of claim 16, further comprising the steps of:
connecting an implement to the vehicle for use during a performance of the operation and imputing parameters of the implement for tracking purposes.

20. The method of claim 16, wherein the operation is selected from the group of planting, harvesting, spraying, tilling, chiseling, cultivating, plowing, spreading, chopping, mowing and bailing.

21. The method of claim 16, wherein the position of the vehicle is tracked using GPS and the power used is tracked using a sensor.

22. The method of claim 16, further comprising the step of suggesting an improved power output based on the maps showing the power used by the vehicle.

\* \* \* \* \*